Feb. 23, 1937.    L. P. SHIELD    2,071,770
APPARATUS FOR DISTRIBUTING OR COLLECTING ARTICLES
Filed June 1, 1933    3 Sheets-Sheet 1

INVENTOR
Lansing P. Shield

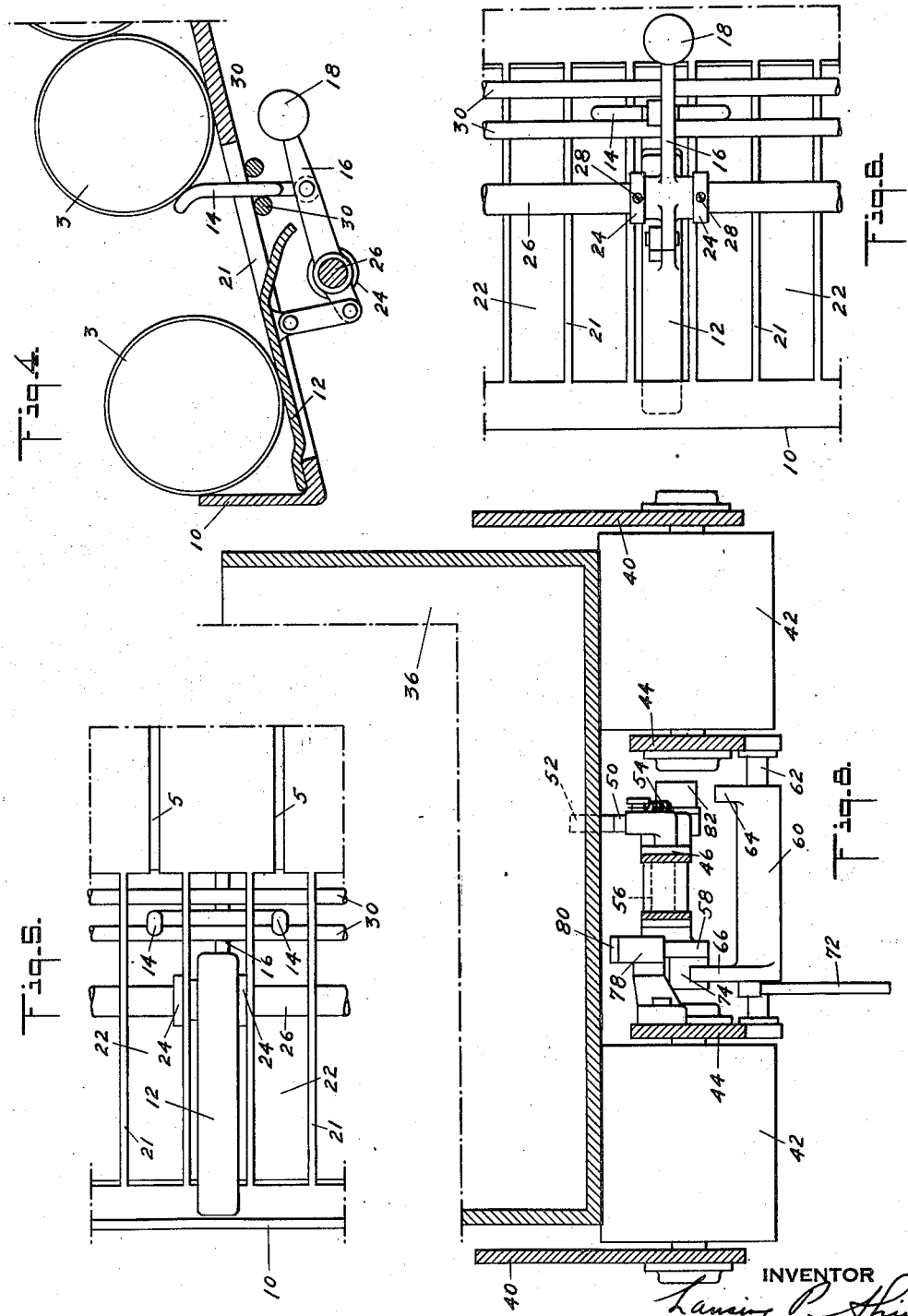

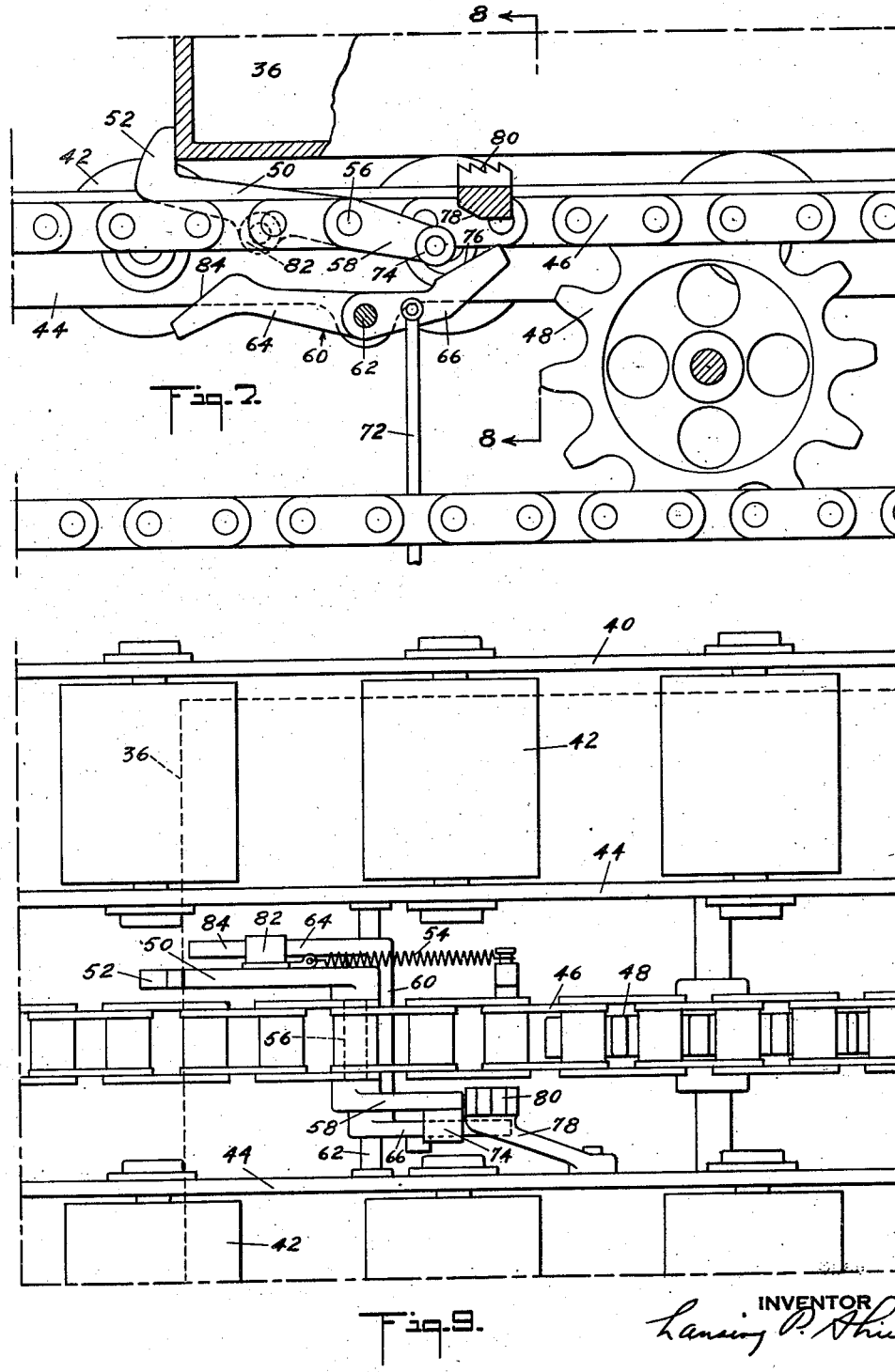

Patented Feb. 23, 1937

2,071,770

UNITED STATES PATENT OFFICE 2,071,770

APPARATUS FOR DISTRIBUTING OR COLLECTING ARTICLES

Lansing P. Shield, Hackensack, N. J.

Application June 1, 1933, Serial No. 673,839

6 Claims. (Cl. 186—1)

My invention relates to systems and apparatus or equipment for filling orders or assembling various groups of objects quickly and economically and particularly to systems and apparatus adapted for use in filling orders in grocery and drug establishments and in department stores, factories, warehouses, manufacturing plants and similar places where it is desired to assemble a variety of groups of articles.

My invention is particularly adapted for filling order for packaged, canned or bottled goods or other articles capable of being easily handled by operators and which are readily delivered through chutes, delivery channels, conveyors or other means from a large stock or supply.

At the present time to fill an order, such as a grocery order for example, a clerk in a local store takes down the order over the telephone or from a customer in the store, and then goes about from one shelf to another located along the walls or in the rear of the store picking out the articles for filling the order from a large variety of articles on widely spaced shelves until the order is completed. This procedure requires considerable time and a large force of employees to accommodate a relatively small number of customers and the time consumed and the number of employees are multiplied, of course, by the number of stores.

In order to overcome this and other difficulties and provide simple, economical means and methods of operation for handling such orders I deliver the various articles from a large stock concentration to a number of different operators each of whom fills a portion only of each order from articles readily accessible to that operator. The articles thus selected are preferably transferred to a receptacle in which all of the articles of a particular order are assembled. Upon completion of one portion of each order the receptacle, or the selected articles, are passed on to another operator who fills another portion of the order and this procedure is followed until the whole order is completed. In this way each of a large number of orders may be filled simultaneously and in rapid succession, so that it is possible to fill a great many orders, giving proper attention to each in a minimum period of time and without consuming as much time as would otherwise be required to fill each order completely and independently of every other order.

This system of operation enables chain organizations, factories and warehouses to handle all delivery orders from a centrally located warehouse or store and to maintain efficient and rapid delivery service at a fraction of the cost now required for the unsatisfactory and expensive methods of handling such orders now in use.

One of the objects of my invention is to reduce the excessive cost and time spent in filling orders or assembling selected articles from a large group comprising the stock, parts, data or other assemblage from which the articles selected are to be drawn.

Another object of my invention is to provide a plurality of delivery means under the control of a single operator from which a portion of an order may be filled.

Another object of my invention is to provide a series of operator stations arranged to effect a rapid and economical selection of articles desired from the entire stock or from a portion thereof.

A further object of my invention is to deliver articles for filling an order or a portion thereof to an operator in a convenient and readily accessible manner.

Another object of my invention is to provide equipment constructed and arranged to enable the operators to transfer desired articles to a receptacle or other means for assembling the order without passing back and forth from one shelf or station to another.

Other objects of my invention are to provide delivery means available to an operator at a station to which articles are supplied, to provide means movable from one station to another to receive the articles selected for filling an order, and to provide means for moving the articles from station to station adjacent the delivery means, so that each order may be filled quickly and easily and thus provide for the efficient handling of a large volume of orders.

These and other objects and features of my invention will appear from the following description thereof as applied to filling grocery orders in which reference is made to the accompanying figures of the drawings illustrating one embodiment of my invention.

In the drawings:

Fig. 4 is a vertical sectional view through the delivery end of one of the delivery channels;

Fig. 5 is a view looking downward at the top of the delivery end of the channel illustrated in Fig. 4;

Fig. 6 is a view looking upward at the bottom of the delivery end of the channel shown in Fig. 4;

Fig. 7 is a vertical sectional view through one form of mechanism for moving the receptacles past the delivery means;

Fig. 8 is a vertical sectional view of the form of mechanism illustrated in Fig. 7 taken on the line 8—8; and Fig. 9 is a plan view of the form of mechanism illustrated in Figs. 7 and 8.

Figure 1:
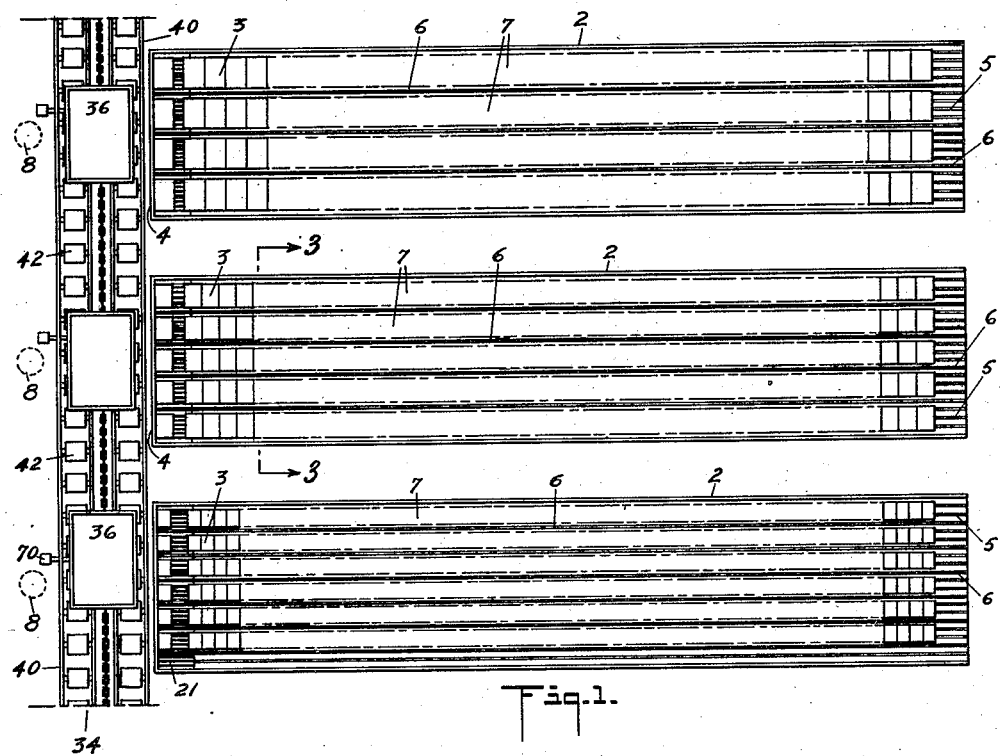
Fig. 1 is a diagrammatic plan view of one arrangement of equipment embodying my invention.
Figure 2:
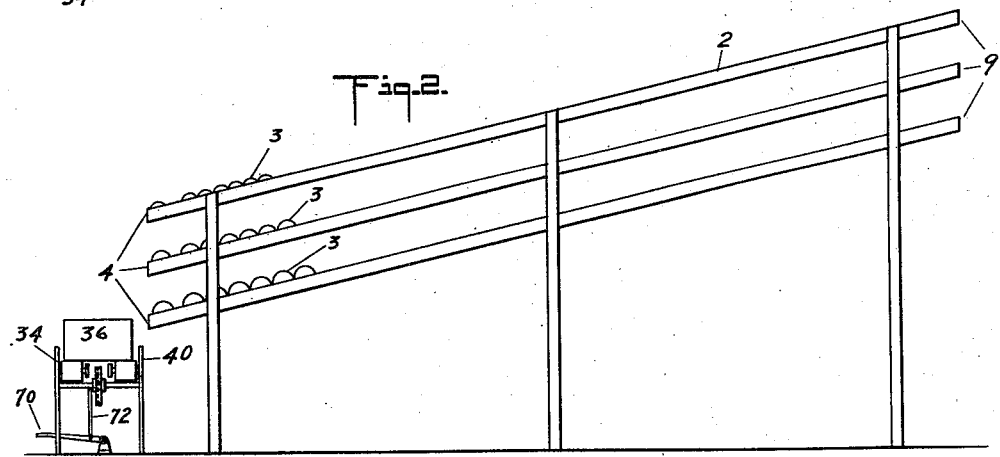
Fig. 2 is a side elevation illustrating the equipment shown in Fig. 1.

In the form of apparatus illustrated in the drawings a plurality of suitable delivery means 2, such as conveyors, chutes or other distributing devices, are provided through which articles 3 such as cans, packages and the like are delivered to an operator. The delivery means are preferably constructed so that the delivery ends 4 thereof are in alignment. The delivery means of each row may be divided or grouped so as to be readily available to an operator 8 stationed in front of the delivery ends of a plurality of such means. As illustrated each delivery means is in the form of a wide chute formed with grooves 5 in the bottom thereof or with suitable means in the top or in both the top and bottom thereof for supporting dividing members 6 which may be used to divide each delivery means into a plurality of delivery channels 7 of the desired size to accommodate the particular kind or type of article to be delivered through that channel. The delivery means may thus be provided with any desired number of grooves 5 and dividers 6 so that the same delivery means may be adapted for handling different types or kinds of goods or articles as required and changes in the size of the various channels may be made from time to time as desired. This construction also enables a standard set of fixtures to be used throughout the whole series of stations and each may be adjusted to accommodate the particular articles to be delivered at a particular station. The delivery means may be made to extend the full width of a single station or may be of half or any other fractional part or multiple of the width of the stations 8 as preferred.

Ordinarily several delivery means are positioned one above the other in tiers 9 so that when sub-divided into delivery channels each operator may handle a large group of articles, say 40 or 50 out of a total of a much larger number of articles comprised in the stock of the store or warehouse.

While the delivery means shown and described are constructed and arranged for adjustment of the delivery channels, the delivery means being spaced apart at adjacent stations, it may in some instances be desirable to arrange the delivery means directly adjacent to each other in a continuous row made up of one or more tiers arranged with the delivery ends thereof in alignment. Although the latter construction is in some respects simpler than the construction shown, the arrangement illustrated enables each delivery means (comprising one or a plurality of delivery channels) to be accessible for inspection, repair and adjustment if such should be necessary. The equipment is also readily accessible to mechanics or others in the event articles become lodged in the delivery channels or fail to be delivered properly for any other reason.

The articles may be supplied to the delivery means or channels from any suitable storage means or sources of supply, not shown, and preferably pass by gravity down the channels into easy reach of the operators. If preferred, the articles may be delivered by means of belts, conveyors, or other suitable delivery means from which they may be removed by the operators. When using inclined chutes, as shown, the goods move by gravity to the delivery end of the channels and as each article is there removed another moves to the delivery end of the channel in position to be removed by the operator. In view of the fact that the delivery channels ordinarily contain a large number of articles, and the channels may be inclined at a relatively steep angle it is necessary to provide some suitable means such as the abutments 10 at the delivery ends of the channels to prevent the cans, packages or other goods from passing out of the delivery means unintentionally or continuously.

The pressure exerted by succeeding articles against the article adjacent the abutment 10 may in some instances be relatively great, especially when the articles themselves are heavy or the delivery channels are positioned at a steep incline. For this reason I prefer to employ a releasing mechanism or other means for relieving the pressure exerted against the article located at the delivery end of the channel in position to be removed. This result may be attained by segregating the foremost article in the delivery channel and preventing articles farther back in the channel from engaging the same. One form of mechanism for this purpose is illustrated in Figs. 4, 5 and 6, in which a member 12 is normally urged upward through the bottom of the channel into position to be engaged by a can or other article passing down through the channel toward the delivery end thereof. Upon contact of an article with the member 12 it is depressed and fingers 14 are raised by an arm 16 so as to extend upwardly through the bottom of the channel into position to hold articles farther back in the channel in spaced relation with respect to the article in engagement with the member 12. The article thus separated comes to rest against the abutment 10 at the delivery end of the channel and may be readily removed by the operator. When the article is removed the member 12 is raised by a weight 18 secured to the arm 16 and at the same time the fingers 14 are retracted so that the remaining articles in the channel may move forward. Upon engagement of the foremost article passing downward through the channel with the member 12 it is again depressed and the fingers 14 are raised so that the remaining articles are held in place. The article released then moves downward into engagement with abutment 10 continuing to hold the member 12 in its depressed position until that article in turn is removed by the operator.

The articles at the delivery ends of the channels are therefore at all times available for easy removal by the operators irrespective of the weight or number of articles in the channels or the angle of inclination of the channels themselves.

Figure 3:
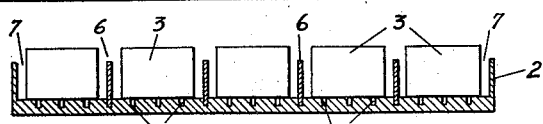
Fig. 3 is an enlarged sectional view illustrating the arrangement of one of the delivery means taken on the line 3—3 of Fig. 1.

When using a releasing mechanism such as that described above with delivery means formed with grooves 5 and removable dividers 6 as shown in Figs. 1 and 3, it is desirable that the releasing mechanism be readily adjustable and replaceable so that one or more may be added to or removed from the delivery means or shifted from one position to another when changes are made in the size or location of the delivery channels 7.

For this purpose the bottom of the delivery means adjacent the delivery end of said means is provided with spaced bars 21 thereby forming slots 22 through which the member 12 and the fingers 14 of the releasing mechanism may project. This construction by means of the slots 22 permits the releasing mechanisms to be placed in any desired position with respect to the delivery means while the bars 21 serve to support the articles being delivered through the channels.

Each releasing mechanism is held in place beneath the delivery means by bushings 24 on which the arm 16 is pivoted. The bushings fit loosely on a rod 26 extending transversely beneath the delivery means and removably mounted in supports, not shown. Any desired number of releasing mechanisms may be positioned on the rod 26 and spaced so as to control the passage of articles through the delivery channels. Ordinarily only one releasing mechanism need be provided for each channel and each is positioned so that the member 12 and fingers 14 thereof extend through the slots 22. Rods 30 may be provided extending the width of the delivery means adjacent the upper ends of the slots 22 for guiding the fingers 14 of the releasing mechanisms.

All of the releasing mechanisms for a single delivery means are mounted on the rod 26. When it is desired to move a single mechanism or to change the number or location of any or all of them the rod 26 is removed from its supports beneath the delivery means and the set screws 28 are loosened. After the desired adjustments in the number or position of the mechanisms have been made, the set screws are tightened and the rod with the mechanisms thereon is replaced in its supports. Each releasing mechanism may thus be applied to and removed from the delivery means with a minimum amount of trouble and delay and may be placed in any desired location to be used in connection with any delivery channel. The equipment is therefore capable of use with a wide variety of articles of different sizes and shape without reconstruction or modification of the delivery means employed.

The forward ends of the delivery means and delivery channels are positioned in alignment adjacent a counter, conveyor or other suitable support 34 along which receptacles 36 move past the delivery means and past each of the delivery stations in turn. Each receptacle is designed to receive the articles required for an order. An order blank with the order indicated thereon preferably moves along with each receptacle and may be carried by the receptacle as it passes along the support from one station to another.

The counter 34 is positioned in front of the operators and between the operators and the ends of the delivery means so that the operators may glance at the order blanks and reach forward to the various delivery channels without turning about or moving from their stations. Experienced operators familiar with the articles delivered to their stations and the location of each may thus fill the orders without taking their eyes from the order blank. Each operator may therefore handle a large number of articles in a short time and without moving or wasting time and energy in proceeding from place to place to obtain the articles called for by the orders.

The counter may be provided with rollers or other suitable means such as an endless belt or the like, upon which are supported receptacles, boxes, etc., for receiving the goods making up each order. The receptacles are movable along the counter past each of the stations in turn and past all of the delivery means and channels so that during its travel from one end of the rows of delivery means to the other end, each receptacle is brought into position to receive an article from any or all of the channels in the apparatus.

In filling orders in accordance with the present system of operation using the apparatus described above it is desirable that the receptacles be moved along the counter step by step from one station to another in interrupted movements, being brought to rest in front of each operator or in front of each group of delivery means before being moved onward to the next operator or the next group of delivery means. In accordance with one form of my invention the receptacles employed are approximately one half the width of the groups of delivery means at each station and each receptacle is moved along the counter step by step so as to be first brought to rest beneath those delivery means at one side of a group and when the operator has filled that portion of the order calling for articles in the delivery means or channels which are located adjacent the receptacle, the receptacle is advanced approximately its own length to bring it into position adjacent the other half of the delivery means at that station. Articles may then be transferred from the latter half of the group of channels into the receptacle before it is moved to the next station and the next operator. This movement of the receptacles enables an operator who may be slow, or who has a particularly active group of articles to handle, to fill the latter portion of her part of the order without holding up other receptacles being delivered from a preceding operator. However it will be understood that my invention is not limited in any way to the use of a receptacle of any particular size or to operations in which a receptacle is stopped twice at each station.

While the means for advancing the receptacles may take any desired form and may cause the receptacles to be moved either continuously or intermittently and the receptacles may even be moved manually from one station to another if desired, I prefer to have the movement of the receptacles effected by power operated means under the control of the operators. One form of mechanism for effecting movement of the receptacles is illustrated in Figs. 7, 8 and 9 wherein the counter is provided with rails 40 extending along the inner and outer edges of the counter and projecting upwardly therefrom to guide the receptacles as they pass along the counter. Rollers 42 for supporting the receptacles are journalled at their outer ends in the rails 40 and at their inner ends in spaced strips 44 located below the tops of the rollers. Between the strips 44 is a linked chain 46 or other suitable means for moving the receptacles along the counter. Toothed wheels 48 actuated by any power operated means, not shown, mesh with the links of the chain to move the same continuously along the counter beneath the receptacles at the desired speed. The receptacles are moved with the chain by means of pivoted lugs 50 carried by the chain and movable into the full line position shown in Fig. 7 with the engaging portion 52 thereof projecting upwardly to engage the receptacle. The lugs 50 are held in their raised position by a spring 54 positioned to cause the lugs to snap upward and remain upward when moved beyond a horizontal line passing through the pivots 56 on which the lugs are mounted. When in their raised positions the lugs continue to carry the receptacles along the counter until retracted.

In order to retract the lugs 50 and release the receptacles from the chain 46, each lug is provided with an oppositely extending retracting member 58 formed integral therewith, which is mounted on the pivot 56 and positioned on the opposite side of the link chain from the lug 50. Movement of the lugs 50 and their associated retracting members 58 about the pivots 56 is effected by means of actuating members 60. Said actuating members are located at each station or at other points where it is desired that a receptacle should be stopped. Each member 60 is mounted on a pivot 62 located beneath the chain 46 and supported at its ends in the strips 44. Each of said actuating members is provided with an arm 64 positioned beneath the lug 50 and with a similar arm 66 located on the opposite side of the chain 46 beneath the retracting member 58.

The actuating member is operated by a foot treadle 70 or any other suitable means such as a hand lever or the like connected by link 72 to the member 60 and is normally held in the position shown in Fig. 7 with the arm 66 in raised position.

As the chain with a receptacle carried thereby moves along the counter the roller 74 on the end of the retracting member 58 engages the bearing surface 76 of arm 66 and rides upward along the same causing the retracting member to be raised and lowering lug 50 so that the portion 52 of the lug is retracted from engagement with the receptacle. As the roller 74 continues to ride upward along the surface 76 it engages the lower inclined face of stop 78 lifting the same and bringing the serrated upper surface 80 thereof into contact with the bottom of the receptacle to positively stop the same and thereby prevent movement of the receptacle on the rollers 42 due to momentum. As the chain moves onward the roller 74 passes off the end of the bearing surface 76. When the lug 50 is lowered and passes its dead center position spring 54 causes it to be held retracted so that it will not engage the same or another receptacle until positively raised by another actuating member further along the counter.

When the operator has filled her portion of the order and the receptacle is to be moved on to the next station or stopping point she steps on the treadle 70 thereby lowering arm 66 of the actuating member 60 and raising arm 64 into position to engage a roller 82 on the next lug 50 carried along by the chain. When the roller engages the bearing surface 84 of the arm 64 it rides upwardly along the same raising the lug 50 and causing it to snap over from its lower to its upper position with the portion 52 thereof in position to engage the receptacle and move it along the counter. On reaching the next station or stopping point the lug 50 engaging the receptacle is retracted by a succeeding actuating member 60 at that station and the receptacle is brought to rest in its new position by a stop 80.

While I have illustrated and described the equipment as embodying delivery means located on one side of the counter 34 only, it may be desirable in some instances to provide a second and preferably similar series of delivery means at the rear of the operator stations so that the operator may handle a greater number of articles at each station. In the latter case the articles delivered at the rear of the station may be those for which there is less frequent demand.

When the order has been filled and the receptacle containing the selected articles has passed the length of the counter it may be removed from the counter and loaded directly into a delivery truck for immediate delivery of the articles to the customer or may be otherwise handled.

In the operation of the mechanism described above it will be apparent that a receptacle is placed on the counter 34 and an order is attached to the receptacle. A lug 50 is then raised to engage the receptacle and the latter moves along the counter to the first station where the retracting member 58 engages the bearing surface 76 of the actuating member at that station moving the lug 50 about its pivot 56 so that the receptacle is released. The stop 80 which is raised by upward movement of the retracting member 58 engages the bottom of the receptacle thus preventing continued forward movement of the receptacle. Meanwhile additional receptacles with their respective orders are started along the counter following the first.

The operator at the first station glances at the order and selects those articles called for by the order which are contained in the delivery means or channels beneath which the receptacle is located. After depositing these articles in the receptacle she steps on the foot treadle 70 raising the arm 64 of the actuating member 60 and thereby raising the next lug 50 carried along by the chain so that the portion 52 engages the receptacle to move it onward to the next station or until stopped by engagement of the roller 74 with the surface 76 of the next actuating member and the consequent disengagement of the portion 52 from the receptacle. The next actuating member 60 may be located to cause the receptacle to come to rest beneath the second half of the operator's channels if desired, so that articles may be removed therefrom while another receptacle is being moved into place beneath the first half of the channels at that station. Upon completing the latter half of her portion of the order the operator steps on the foot treadle associated with the actuating member for the second half of the channels and then proceeds to fill her portion of the next order, that is, for the following receptacle, from the first half of the channels, while the first receptacle moves on to the next station to be handled by the operator at that point. When a receptacle makes only one stop at the station it will move on, of course, to the next station upon the operation of the first treadle. No second actuating member and treadle are then necessary for that station.

In this way each receptacle passes down the counter step by step past each of the stations in turn and beneath all of the delivery means so that the complete orders are delivered one after another in rapid succession at the end of the counter. The volume of orders handled may thus be greatly increased, the cost and time required for filling each order reduced and deliveries to customers may be made quickly and at relatively small expense.

My system has the further advantage that perishable goods may be taken from refrigerating chambers in the warehouse directly to the customers' homes and the high loss to the dealer caused by even a small wastage in each of a large number of branch stores is practically eliminated.

While I have described my invention with particular reference to grocery systems it is apparent that my invention is applicable also to industrial and manufacturing plants or warehouses for collecting and distributing selected groups of various types of articles, parts, data, or the like.

The equipment shown and described for use in practicing my invention may be varied considerably in form and arrangement and the method of operation may be changed in numerous respects. It should be understood therefore that the foregoing description is intended to illustrate and not to limit the scope of my invention.

I claim:

1. In a distributing system, a plurality of inclined delivering channels adapted to receive articles and deliver same by gravity to the lower ends thereof, said channels being divided into groups having the delivery ends thereof arranged to be easily accessible to an operator and provided with means for holding the lowermost article in each channel in spaced relation with respect to other articles therein, a support positioned in front of said groups of channels and in front of operators stationed thereby, receptacles movable along said support from one group of delivering channels to another, and means under control of the operator at each group of delivering channels for moving the receptacle on to the next group of delivering channels.

2. In a distributing system the combination comprising a support, a plurality of delivery channels terminating adjacent said support each of which channels is provided with means at the delivery end thereof operable upon removal of an article from said channel to segregate and hold another article in spaced relation with respect to other articles remaining in the channel and in position to be readily removed therefrom by an operator, a plurality of operator stations located on the opposite side of said support from the delivery ends of said channels, receptacles movable in succession past each of said channels and between the delivery ends thereof and said stations to receive articles from said channels, means for moving said receptacles along said support, stop mechanism for interrupting movement of a receptacle at an operator station and means under the control of an operator for releasing said receptacle for continued movement.

3. A system for the assembling of heterogeneous articles from a plurality of sources which comprises means forming an assembling path for the assemblage of said heterogeneous articles, a receptacle for holding the said articles, movably disposed along said path, a plurality of gravity chutes for transferring the articles from said sources to assembly points along the said assembling path, means for progressively transferring the said receptacle along said assembling path, means for automatically arresting the said receptacle at predetermined points along the said assembling path for the introduction of articles thereto from said chutes, and means under the control of an operator, for re-establishing the transferring movement of said receptacle along the said assembling path.

4. An apparatus for use in rapidly collecting and assembling various articles into a plurality of receptacles, comprising in combination conveyor means for carrying the receptacles past a plurality of loading stations, a plurality of inclined gravity chutes, arranged in groups, with the lower or delivery ends of each group positioned close to the conveyor and opposite a loading station, said gravity chutes serving to maintain a steady supply of articles at each loading station, each loading station being adjacent the conveyor and on the side opposite the delivery ends of the chutes, whereby an operator at a loading station is facing both the conveyor and the delivery ends of the chutes, said conveyor means being continuously driven; automatically operating means for stopping the receptacles at the several loading stations, and means cooperating with the conveyor, and under control of the operators at the several loading stations, for thereafter starting the receptacles on their way to the next loading station.

5. In a distributing system, the combination comprising a support for a plurality of receptacles, a plurality of delivery channels each of which is supplied with a different article and serves to convey the article from a storage point to a point adjacent to said support, said channels being arranged in groups with the delivery ends of the channels of each group located in front of an operator and on one side of said support in position to be readily accessible to the operator while standing in one position, an operator's station associated with each of said groups of channels and located on the opposite side of said support and adjacent the delivery ends of said channels, means at each operator's station for stopping a receptacle at said station, and starting means under the control of the operator at each station for moving a receptacle on to the next station, said starting and stopping means being operable independently of the operation of said means at any other station.

6. In a merchandise distributing system, the combination comprising a plurality of parallel segregated groups of inclined delivery channels for the continuous movement of articles from a storage point for distribution, an equal number of operators' stations disposed opposite and facing respectively one of said plurality of segregated groups of channels so that the articles at the delivery ends of all the channels of each segregated group are accessible to the station opposite such group without movement of the operator thereat, a horizontal support between said stations and said groups of channels having a plurality of receptacles thereon for articles selected from the delivery ends of said channels, said support being positioned for the movement of said receptacles successively along said support from one station and group to another station and group and below the delivery ends of said groups of channels in a direction substantially at right angles to the movement of the articles in said channels, means at each operator's station for stopping the receptacles thereat, and starting means under the control of the operator at each station for moving said receptacles on to another station and group of channels, said stopping and starting means being operable independently of the operation of said means at any other station.

LANSING P. SHIELD.